Oct. 28, 1969     E. A. SCHMITT     3,474,838
TOOL GUIDES
Filed Sept. 27, 1967
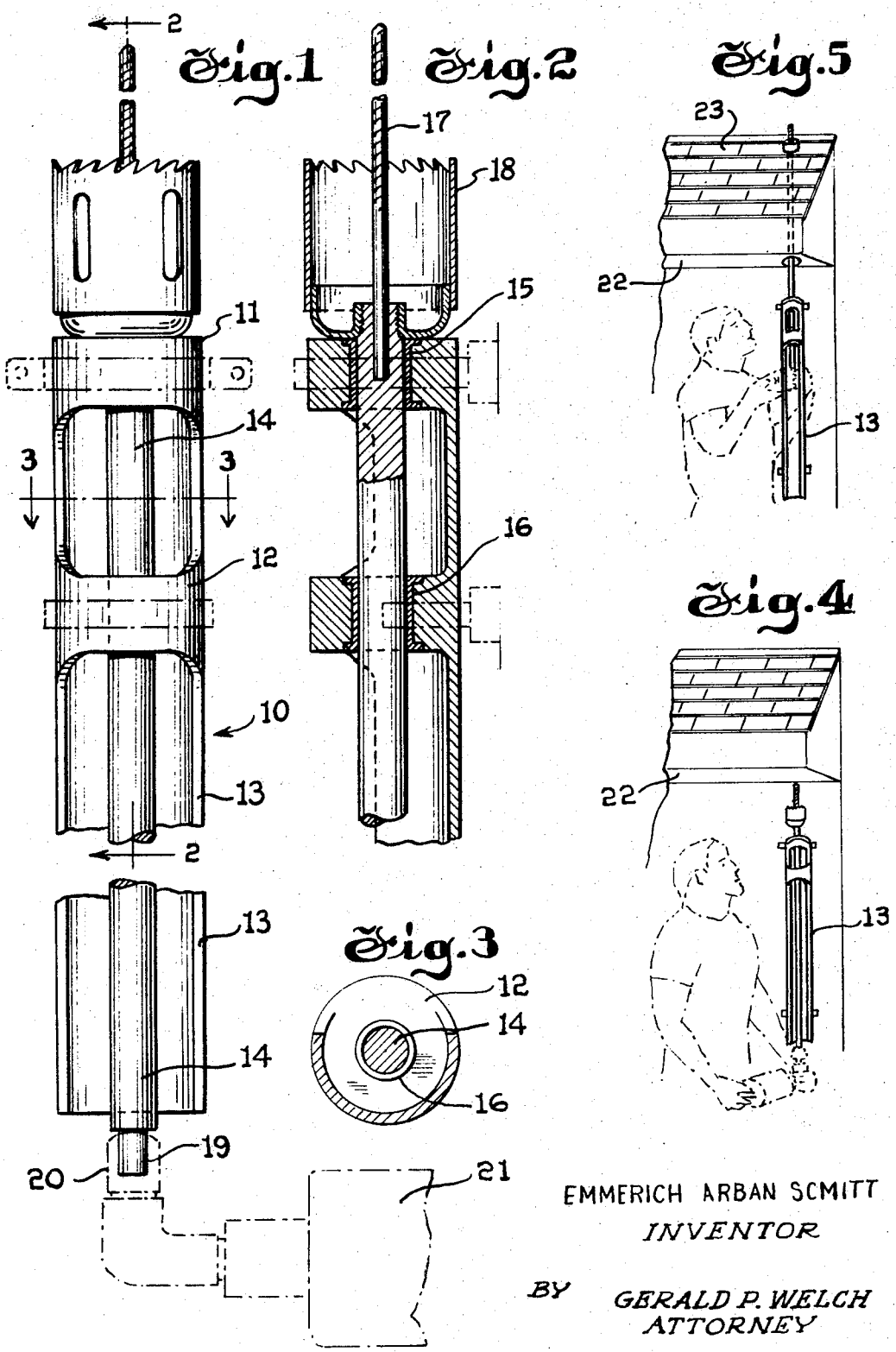
EMMERICH ARBAN SCMITT
*INVENTOR*
BY    *GERALD P. WELCH*
*ATTORNEY*

United States Patent Office 3,474,838
Patented Oct. 28, 1969

3,474,838
TOOL GUIDES
Emmerich Arban Schmitt, 4665 Shasta Drive,
Brookfield, Wis. 53005
Filed Sept. 27, 1967, Ser. No. 670,959
Int. Cl. B23b *45/14;* B27c *3/08*
U.S. Cl. 144—105                                    1 Claim

ABSTRACT OF THE DISCLOSURE

A boring and cutting tool including a pilot drill and a circular end saw concentrically disposed journalled axially in a partially tubular structure approximately half-round for the greater portion of its length, said latter portion for clamping to a plane surface as a guide.

---

In the drawings:

FIG. 1 is a front view in elevation of a tool and guide embodying the invention.

FIG. 2 is a side cross-sectional view thereof.

FIG. 3 is a view taken on line 3—3 of FIG. 1.

FIG. 4 is a frontal view in elevation showing the device in position for cutting a mast receptacle aperture in the eave and roof of a building.

FIG. 5 is a similar view showing position of the tool and guide after completion of the cutting operation.

In the drawings, the guide member 10 has a tubular portion 11 at the upper end thereof, and a second tubular portion 12 spaced therefrom, with the lower and greater portion thereof, 13, being approximately half-round in cross-section, this being an improvement over the old form of the same tool in which the portion 13 was entirely tubular. A rod or shaft 14 is rotatable as well as vertically movable within the bearings 15 and 16, and carries at its upper end the pilot drill 17 and the circular end saw 18. At its lower end, the reduced portion 19 is appropriately formed to engage the driving portion 20 of the drilling unit 21. If portion 13 were tubular rather than approximately half-round a much longer rod or shaft 14 would be necessary to extend and move upwardly the pilot drill 17 and the end saw 18 through the eave member 22 and the slanted roof 23.

The guide 10 may be held in plumb position by clamp means secured at tubular portion 11 and adjacent the lower end of portion 13. The drilling device may be moved upwardly the entire length of the half-round portion 13 without interference, to move the tools 17 and 18 in cutting a mast receptacle aperture through the roof 29.

It will be understood that the device is capable of many modifications in structure and design without departing from the spirit of the invention, within the scope of the appended claim.

Having thus described the invention, what is claimed and desired to be secured by Letters Patent of the United States is:

1. A line-up drill including a pilot boring element on the upper end of a rod, a circular end saw thereon disposed short of the pilot boring element, a guide base for the rod, spaced tubular portions constituting the top of said guide base, an integral substantially half-round portion extending downwardly for the greater length of said guide base, bearings in the spaced tubular portions adapted to permit rotative as well as vertical movement of the rod and its boring and saw tools.

References Cited

UNITED STATES PATENTS

| 1,207,717 | 12/1916 | Dartt. |
| 3,011,369 | 12/1961 | Russell. |
| 3,016,073 | 1/1962 | Broussard et al. _____ 144—105 |

DONALD R. SCHRAN, Primary Examiner

U.S. Cl. X.R.

77—55